(12) United States Patent
Miller et al.

(10) Patent No.: US 9,957,064 B2
(45) Date of Patent: May 1, 2018

(54) UTILIZING AN UNMANNED AERIAL VEHICLE PLATFORM WHICH IS EQUIPPED WITH A TURNTABLE ASSEMBLY

(71) Applicant: AAI Corporation, Hunt Valley, MD (US)

(72) Inventors: Stephen W. Miller, Cockeysville, MD (US); Zachary J. Smith, Hanover, PA (US); Peter J. Helman, Saint Augustine, FL (US)

(73) Assignee: AAI Corporation, Hunt Valley, MD (US)

( * ) Notice: Subject to any disclaimer, the term of this patent is extended or adjusted under 35 U.S.C. 154(b) by 451 days.

(21) Appl. No.: 14/707,424

(22) Filed: May 8, 2015

(65) Prior Publication Data

US 2016/0325849 A1   Nov. 10, 2016

(51) Int. Cl.
*B64F 1/06* (2006.01)
*B64F 1/02* (2006.01)
*B64C 39/02* (2006.01)

(52) U.S. Cl.
CPC .............. *B64F 1/06* (2013.01); *B64C 39/024* (2013.01); *B64F 1/02* (2013.01); *B64F 1/025* (2013.01);
(Continued)

(58) Field of Classification Search
CPC ............ B64C 39/024; B64C 2201/084; B64C 2201/182; B64F 1/02; B64F 1/025; B64F 1/04; B64F 1/06; B64F 1/24
(Continued)

(56) References Cited

U.S. PATENT DOCUMENTS

| 1,792,000 A | * | 2/1931 | Carver | ..................... B64F 1/06 244/63 |
| 1,793,744 A | | 2/1931 | Nabona et al. | |

(Continued)

FOREIGN PATENT DOCUMENTS

| GB | 688378 A | * | 3/1953 | ................ B64F 1/06 |
| WO | 0214150 A1 | | 2/2002 | |

(Continued)

OTHER PUBLICATIONS

International Application No. PCT/US2016/030914 International Search Report and Written Opinion including PCT/ISA/220, PCT/ISA/210, and PCT/ISA/237 to AAI Corporation, dated Aug. 3, 2016, 13 pages.

*Primary Examiner* — Richard R Green
*Assistant Examiner* — Brady W Frazier
(74) *Attorney, Agent, or Firm* — BainwoodHuang (57) ABSTRACT

An unmanned aerial vehicle (UAV) platform includes a stationary base constructed and arranged to reside over a fixed location on a surface (e.g., a ground location, a ship's deck, a trailer or other vehicle, etc.). The UAV platform further includes a set of UAV interfaces constructed and arranged to interface directly with a UAV (e.g., a launcher, a net apparatus, etc.). The UAV platform further includes a turntable assembly which couples to the stationary base. The turntable assembly is constructed and arranged to couple to each UAV interface and control angular direction of that UAV interface over the fixed location. A method of operating a UAV platform includes deploying the UAV platform over a fixed location, preparing a UAV interface on a turntable assembly of the UAV platform, and rotating the turntable to control angular direction of the UAV interface over the fixed location.

21 Claims, 8 Drawing Sheets

(52) U.S. Cl.
   CPC .. *B64C 2201/084* (2013.01); *B64C 2201/182* (2013.01)

(58) Field of Classification Search
   USPC .......................................................... 244/63
   See application file for complete search history.

(56) References Cited

U.S. PATENT DOCUMENTS

| | | | |
|---|---|---|---|
| 4,591,682 A * | 5/1986 | Takeuji | F16D 1/06 219/738 |
| 7,712,702 B2 | 5/2010 | McGeer et al. | |
| 8,028,952 B2 | 10/2011 | Urnes, Sr. | |
| 8,336,816 B2 | 12/2012 | Miller | |
| 8,453,967 B2 | 6/2013 | Miller et al. | |
| 8,944,373 B2 | 2/2015 | Dickson et al. | |
| 9,340,301 B2 | 5/2016 | Dickson et al. | |
| 2005/0178895 A1 * | 8/2005 | McGeer | B64C 39/024 244/63 |
| 2007/0051849 A1 | 3/2007 | Watts et al. | |
| 2009/0224097 A1 * | 9/2009 | Kariv | B64F 1/02 244/63 |
| 2011/0303789 A1 * | 12/2011 | Miller | B64F 1/02 244/110 C |
| 2012/0032025 A1 * | 2/2012 | Allen | B64F 1/02 244/110 C |
| 2013/0007935 A1 * | 1/2013 | Chin | B64G 1/005 2/2.13 |
| 2014/0061377 A1 * | 3/2014 | Smith | B64C 3/10 244/63 |
| 2015/0076285 A1 * | 3/2015 | Chavez, Jr. | B64F 1/02 244/116 |
| 2015/0239578 A1 * | 8/2015 | McGeer | B64F 1/02 244/110 R |
| 2016/0376031 A1 * | 12/2016 | Michalski | B64F 1/36 701/15 |

FOREIGN PATENT DOCUMENTS

| | | | | |
|---|---|---|---|---|
| WO | WO-2010031384 A2 * | 3/2010 | | B64F 1/06 |
| WO | 2013055265 A1 | 4/2013 | | |

* cited by examiner

UTILIZING AN UNMANNED AERIAL VEHICLE PLATFORM WHICH IS EQUIPPED WITH A TURNTABLE ASSEMBLY

BACKGROUND

An unmanned aerial vehicle (UAV) is an aircraft which flies without a pilot on board. Operational requirements for the UAV often include the capability to take off and land without a runway. Ideally, such a UAV is launched and recovered into the wind to maximize lift and reduce ground speed requirements.

Typical UAV launch and recovery devices have wind envelope limitations that define the maximum allowable crosswind and tail wind. When these limitations are exceeded, which often happens when wind direction and velocity changes, launch and recovery is not allowed to prevent damage to the UAV or hazards to ground personnel.

A first conventional approach to deal with these wind envelope limitations is for a human ground crew to reorient the launch and recovery equipment.

A second conventional approach is for a human ground team to have two sets of freestanding UAV launch and recovery equipment delivered and pointed in different directions at the launch and recovery location. Under this second conventional approach, if the wind changes direction making one set of launch and recovery equipment unsuitable, the direction of the other set of launch and recovery equipment may be acceptable thus enabling UAV launch and recovery using the other set of launch and recovery equipment.

SUMMARY

Unfortunately, there are deficiencies to the above-described conventional approaches to launching and recovering an unmanned aerial vehicle (UAV). For example, in the first conventional approach, the reorientation of the launch and recovery equipment is labor intensive and time consuming. And, as often happens, the wind speed and direction changes during operation requiring further reorientation.

Additionally, in the second conventional approach, the launch and recovery tasks use two separate and distinct sets of launch and recovery systems. Accordingly, this approach heavily consume resources (e.g., extra equipment, extra delivery and setup time, extra transportation costs, etc.) and space. Moreover, even when two sets of freestanding UAV launch and recovery systems are delivered to a launch and recovery location and pointed in different directions, the possibility still exists that neither will be aimed into the wind. Accordingly, if a launch into the wind is strictly required, the human launch team will be forced to manually re-orient one of the freestanding UAV launchers to point into the wind. Such operation requires additional time and effort, and may be impractical in situations where the wind direction changes every few minutes.

Furthermore, such conventional approaches may be impractical for use in confined locations such as on small vessels with limited ship deck area. For example, a small vessel may not have enough room on its ship deck to locate all of the UAV equipment without interfering with other ship deck activities. Even vessels with relatively large ship decks may not be able to dedicate much room for UAV launch and recovery due to other committed uses and/or restrictions, e.g., liftoff and landing of other air vehicles, placement of cargo and/or other equipment, restrictions regarding UAV approach angles, etc. Moreover, due to limitations of the UAV recovery apparatus, it may be difficult to capture a UAV in flight from a ship deck without either manually turning (i.e., pivoting) the UAV recovery apparatus on the ship deck or directing the vessel to make course changes to properly orient the net. Likewise, due to the particular location of the UAV recovery apparatus on a ship deck, it may be difficult to unload a captured UAV from the UAV recovery apparatus without manually turning the UAV recovery apparatus.

In contrast to the above-described conventional approaches to launching and recovering a UAV, improved techniques are directed to utilizing a UAV platform which is equipped with a turntable assembly. Such a platform enables precise control over angular direction even if the UAV platform is initially deployed at a poor angle. Accordingly, such a platform alleviates the need to provide multiple UAV launchers at the same launch location. Moreover, launch and recovery elements can be integrated into the UAV platform thus making the UAV platform suitable for confined locations such as on a small vessel with a limited ship deck area.

One embodiment is directed to a UAV platform which includes a stationary base constructed and arranged to reside over a fixed location on a surface (e.g., a ground location, a ship's deck, a trailer or other vehicle, etc.). The UAV platform further includes a set of UAV interfaces (e.g., a launcher, a net apparatus, etc.) constructed and arranged to interface directly with a UAV. The UAV platform further includes a turntable assembly which couples to the stationary base. The turntable assembly is constructed and arranged to couple to each UAV interface and control angular direction of that UAV interface over the fixed location.

In some arrangements, the turntable assembly includes a lower turntable portion, an upper turntable portion, a set of rollers, slip ring, and a drive system (slew drive, gear box, and motor). The lower turntable portion connects to the stationary base. The upper turntable portion connects to the set of UAV interfaces. The set of rollers, slip ring, and slew drive separate the upper turntable portion from the lower turntable portion. The drive system rotates the upper turntable portion relative to the lower turntable portion.

In some arrangements, the stationary base includes a flat rack pallet coupled to the lower turntable portion. In these arrangements, the flat rack pallet enables the unmanned aerial vehicle platform to be deployed from a carrier to the fixed location on the surface via a handling device with interface to fork pockets, lifting shackles, or trailer hitch.

In some arrangements, the set of UAV interfaces includes a UAV launcher which is constructed and arranged to launch the UAV from the fixed location and in the angular direction into the wind. Such an arrangement provides for effective wind direction management.

In some arrangements, the UAV launcher includes a launch ramp constructed and arranged to guide the UAV during launch, and a propulsion mechanism to impart force on the UAV during launch. In these arrangements, the turntable assembly controls direction of the launch ramp to provide azimuth control during launch.

In some arrangements, the turntable assembly is constructed and arrange to rotate the launch ramp to (i) a first angular displacement to enable installation of the UAV on the launch ramp of the UAV launcher prior to launch and (ii) a second angular displacement to launch into the wind following installation. In these arrangements, the turntable assembly may be electronically controlled.

In some arrangements, the set of UAV interfaces includes a net apparatus which is constructed and arranged to capture the UAV while the UAV is in flight in the angular direction for effective wind direction management. In some arrangements, the net apparatus includes a mesh constructed and arranged to ensnare the UAV during flight, and an assembly of side poles constructed and arranged to support the mesh when the mesh ensnares the UAV.

In some arrangements, the turntable assembly is constructed and arrange to rotate the mesh to (i) a first angular displacement to provide a mesh plane for the UAV to hit during flight and (ii) a second angular displacement to enable unloading of the UAV from the mesh following UAV capture.

In some arrangements, the unmanned aerial vehicle platform operates as an integrated UAV launch and recovery system. In these arrangements, the set of UAV interfaces includes (i) a UAV launcher and (ii) a net apparatus. The upper turntable portion of the turntable assembly is constructed and arranged to selectively connect to (i) the UAV launcher to launch the UAV from the fixed location and (ii) the net apparatus to capture the UAV while the UAV is in flight.

Another embodiment is directed to a method of operating an unmanned aerial vehicle platform. The method includes deploying a UAV platform over a fixed location on a surface. The method further includes attaching a UAV interface to a turntable assembly of the unmanned aerial vehicle platform, and rotating the turntable to control angular direction of the UAV interface over the fixed location. The UAV interface is constructed and arranged to interface directly with a UAV.

In some arrangements, the UAV interface includes a launch ramp. In these arrangements, attaching the UAV interface to the turntable assembly includes installing the launch ramp on the turntable assembly, the launch ramp being constructed and arranged to guide the UAV during launch.

In some arrangements, rotating the turntable to control angular direction of the UAV interface over the fixed location includes aiming the launch ramp in a first direction into the wind for effective wind direction management.

In some arrangements, the method further includes loading the UAV on to the launch ramp, and launching the UAV from the launch ramp in the first direction into the wind.

In some arrangements, the method further includes stowing the launch ramp on the turntable, and assembling a net apparatus on the turntable, the net apparatus forming a mesh plane to capture the UAV while the UAV is in flight. In some arrangements, stowing the launch ramp and assembling the net apparatus occur while the UAV is in flight.

In some arrangements, the method further includes rotating the net apparatus on the turntable in a second direction to orient the mesh plane to provide a maximum capture area.

In some arrangements, capturing the UAV using the net apparatus while the UAV is in flight.

Other embodiments are directed to systems and apparatus, processing circuits, mechanisms, and so on. Some embodiments are directed to various methods, mechanical and/or electronic components which are involved in utilizing a UAV platform which is equipped with a turntable assembly.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing an unmanned aerial vehicle (UAV) platform which is equipped with a turntable assembly. Such a platform enables precise control of angular direction even if the UAV platform is initially deployed at a poor angle (e.g., initially aimed in a sub-optimal direction). Accordingly, such a platform alleviates the need to provide multiple UAV launchers at the same launch location to accommodate different or changing wind directions. Additionally, such a UAV platform allows for UAV recovery on water vessels with approach angle restrictions without requiring the vessels to make course changes. Moreover, launch and recovery elements can be integrated thus making the UAV platform suitable for confined spaces such as small land sites or on small vessels with limited deck area.

Figure 1:
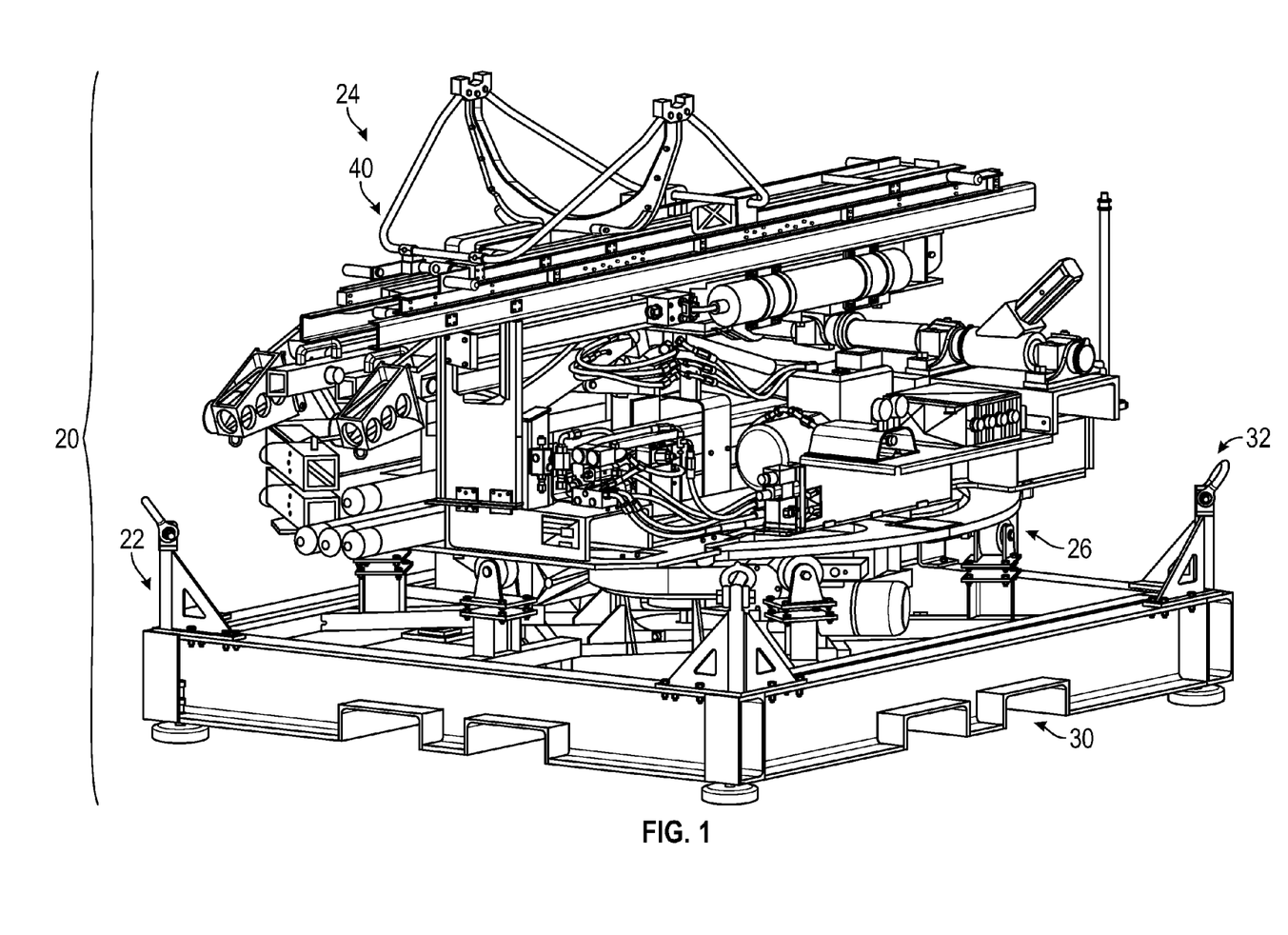
FIG. 1 is a perspective view of an unmanned aerial vehicle (UAV) platform which is equipped with a turntable assembly.
Figure 2:
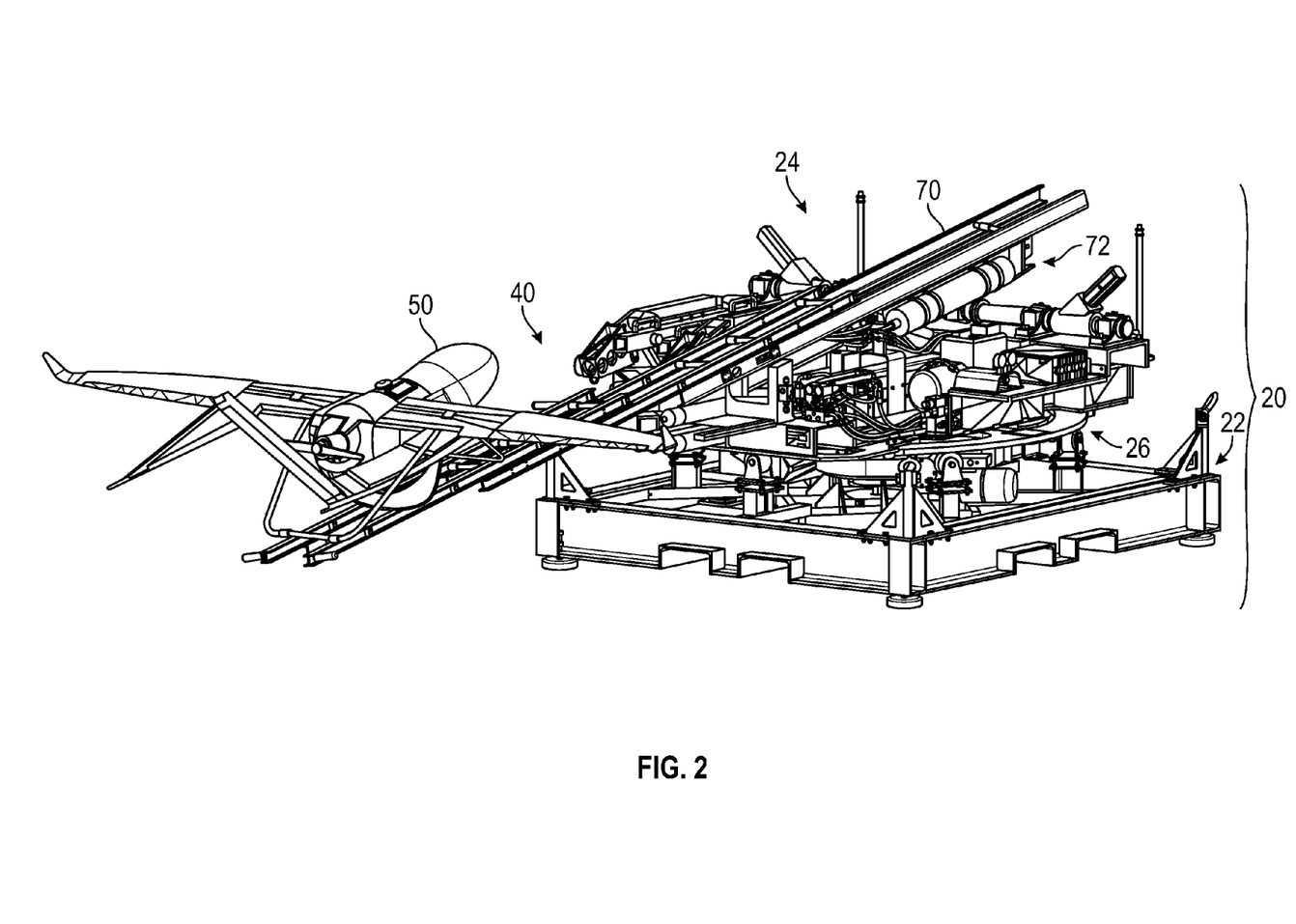
FIG. 2 is a perspective view of the UAV platform equipped with a launcher loaded with a UAV ready for launch.
Figure 3:
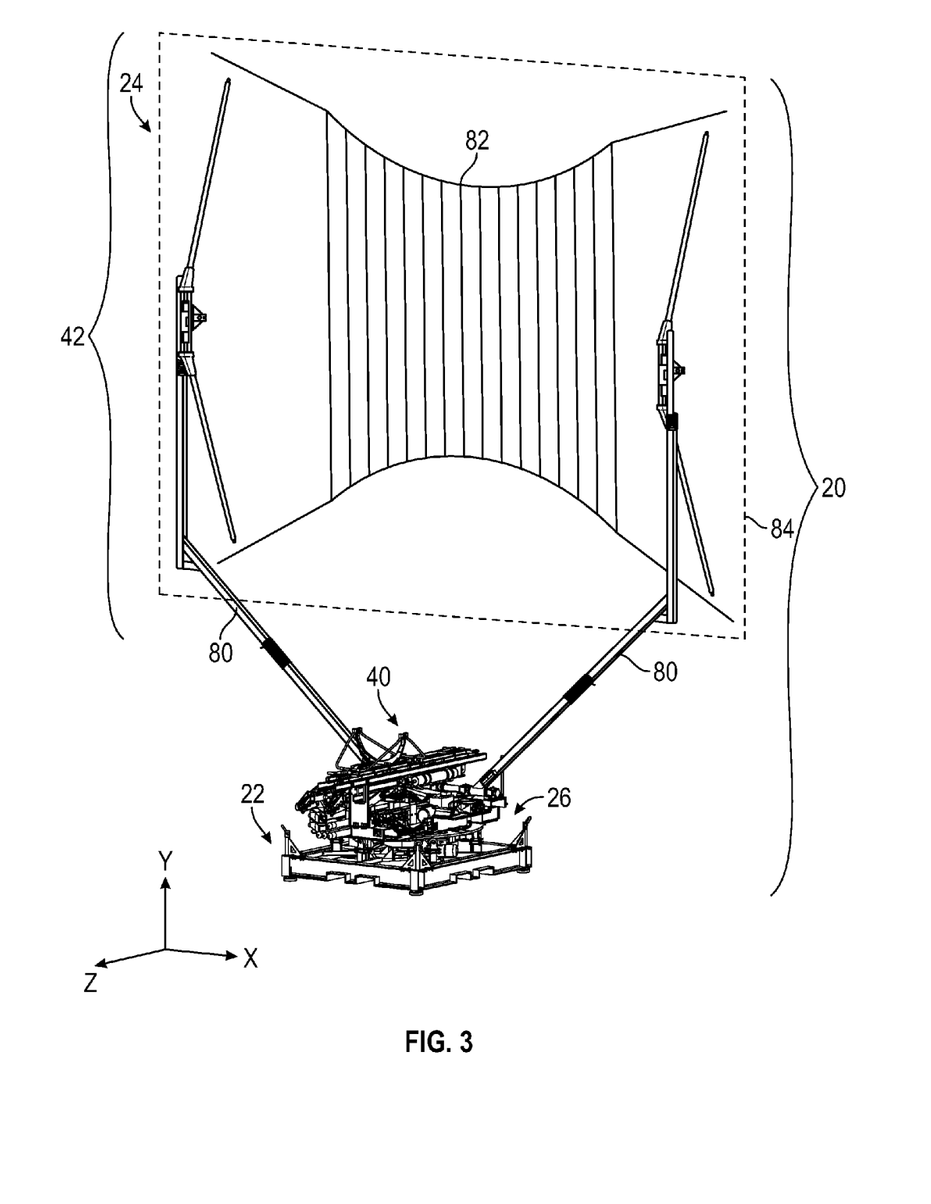
FIG. 3 is a perspective view of the UAV platform equipped with a net apparatus ready to capture a UAV.
Figure 4:
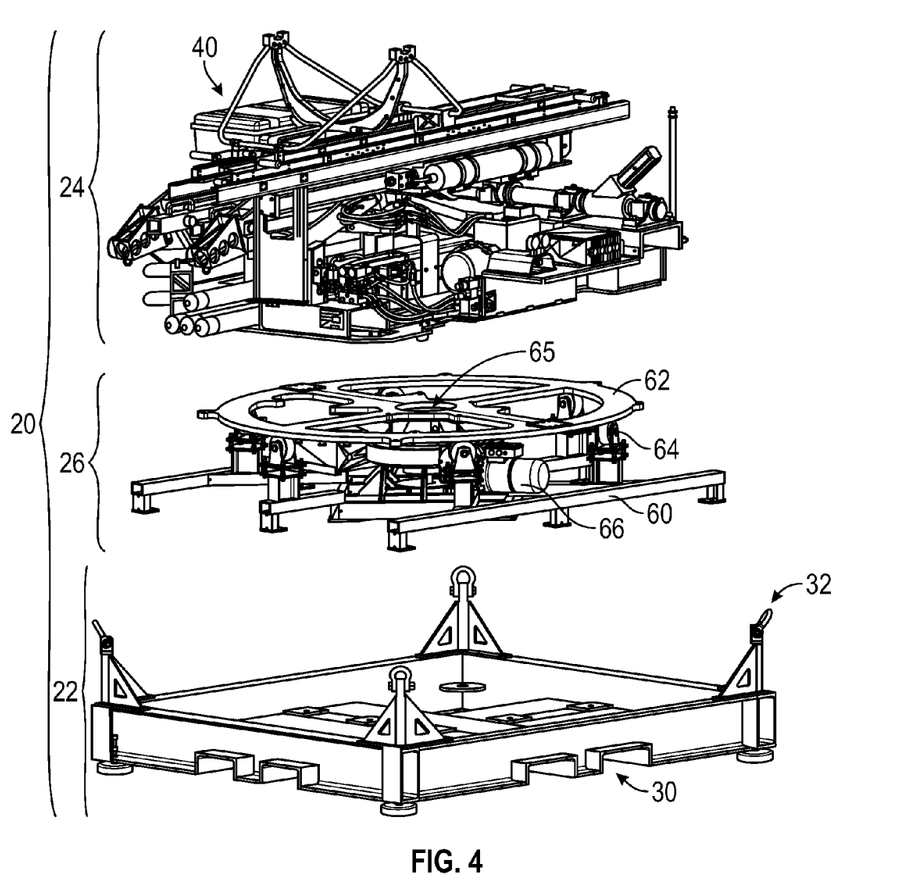
FIG. 4 is an exploded view of the UAV platform.

FIGS. 1 through 4 show a UAV platform 20 which includes a base 22, a set of UAV interfaces 24, and a turntable assembly 26. FIG. 1 shows a general view of the UAV platform 20. FIG. 2 shows the UAV platform 20 in a UAV launch configuration or mode. FIG. 3 shows the UAV platform 20 in a UAV capture configuration or mode. FIG. 4 shows a partially exploded view of the UAV platform 20.

As shown in FIGS. 1 through 4, the base 22 is constructed and arranged to remain stationary over a fixed location on a surface (e.g., a ground location, a ship deck, a trailer, etc.). In some arrangements, the base 22 includes a logistic handling system flat rack pallet section 30 which couples to the turntable assembly 26. In these arrangements, the flat rack pallet section 30 enables the UAV platform 20 to be deployed from a carrier (e.g., a flatbed vehicle, a cargo container, etc.) to the fixed location via a pallet handling device. Other deployment features are suitable for use as well such as hoist elements 32 which enable the UAV platform 20 to be lifted.

The set of UAV interfaces 24 includes a UAV launcher 40 (FIG. 2) and a UAV net apparatus 42 (FIG. 3). Each UAV interface 24 is constructed and arranged to interface directly (i.e., make physical contact) with a UAV 50 (see FIG. 2). In particular, the UAV launcher 40 is constructed and arranged to launch the UAV 50. Additionally, the UAV net apparatus 42 is constructed and arranged to capture the UAV 50.

As best seen in FIG. 4, the turntable assembly 26 includes a lower turntable portion 60, an upper turntable portion 62, a set of rollers (e.g., wheels, casters, bearings, etc.) 64, slip ring 65, and a drive system 66. The lower turntable portion 60 connects to the stationary base 22. The upper turntable portion 62 connects to the set of UAV interfaces 24. The set of rollers 64 separates the upper turntable portion 62 from the lower turntable portion 60 and enables the upper turntable portion 62 to rotate relative to the lower turntable portion 60 within a horizontal plane and about a center axis. The drive system 66 provides drive in either direction (i.e., clockwise or counterclockwise) to reliably and robustly rotate the upper turntable portion 62 relative to the lower turntable portion 60.

As shown in FIGS. 1-4, such an architecture enables the UAV platform 20 to change direction in response to changing situations, e.g., changing wind directions during launch, a changing UAV flight path, a change in course of a vessel carrying the UAV platform 20, to unload a captured UAV 50 and/or accommodate installation of a particular UAV interface 24 in a confined space (e.g., the net apparatus 42 on a small ship deck with limited space, etc.). Furthermore, the UAV platform 20 maximizes flexibility in that various UAV interfaces 24 and related equipment can be prepared on and/or attached to the turntable assembly 26.

Figure 5:
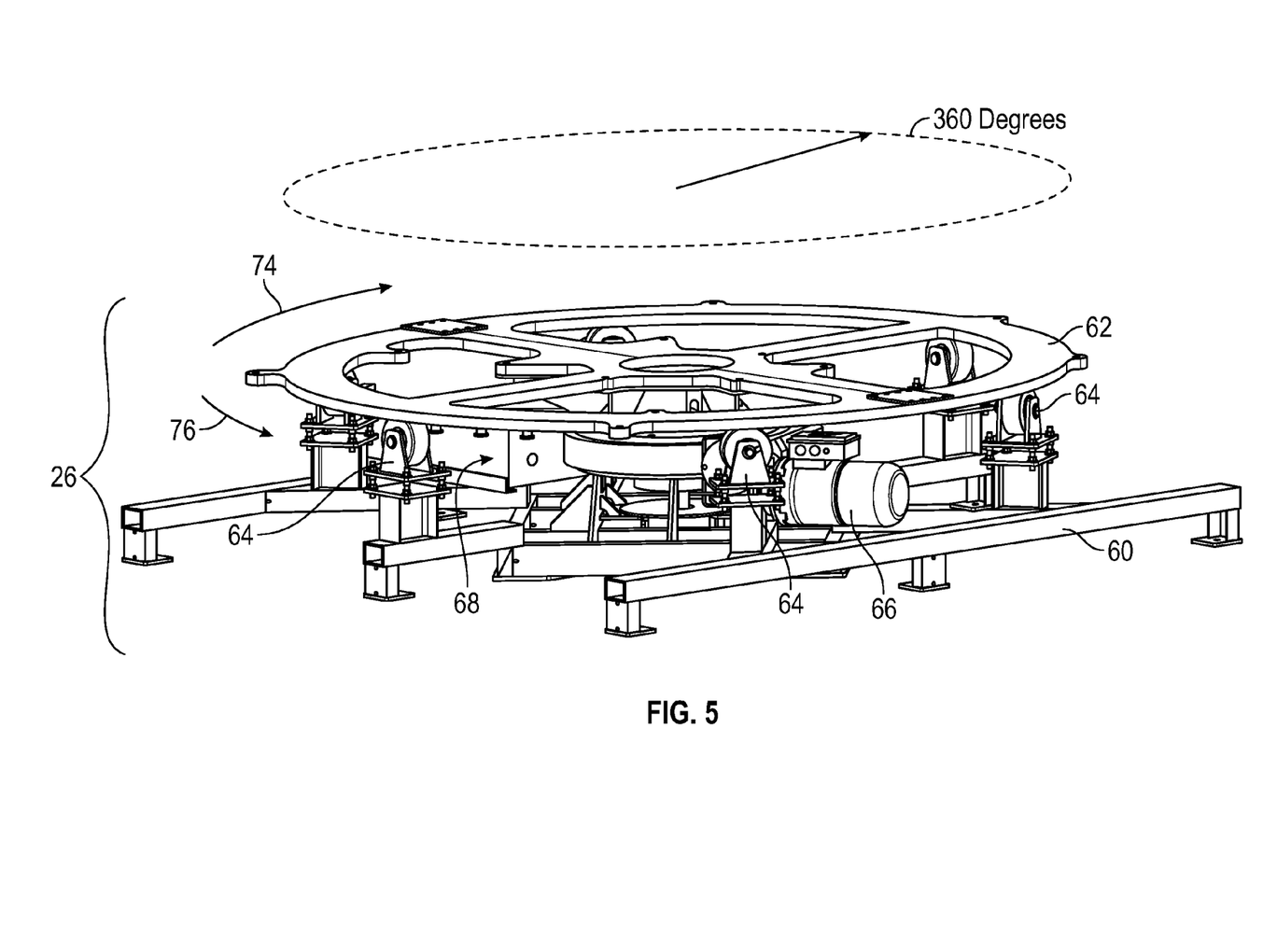
FIG. 5 is detailed view of the turntable assembly of the UAV platform.

FIG. 5 shows a detailed view of the rollers 64 and the drive system 66 of the turntable assembly 26. In some arrangements, the turntable assembly 26 is equipped with control circuitry 68 (e.g., position sensors, a compass, an electronic controller, etc.) which enables the turntable assembly 26 to provide precise azimuth control based on electronic commands and/or programming. Accordingly, the UAV platform 20 is able to control angular direction of the UAV interfaces 24 (FIGS. 1-4) over a fixed location such as a ground location or ship deck for improved wind direction management.

In some arrangements, the turntable assembly 26 provides a full and continuous 360 degrees of freedom. Accordingly, there are no restrictions when aiming the UAV interfaces 24 in any compass directions.

In connection with the UAV interfaces 24 and as best seen in FIG. 2, the UAV launcher 40 includes a launch ramp 70 and a propulsion mechanism 72. The launch ramp 70 is constructed and arranged to guide the UAV 50 during launch while the turntable assembly 26 holds the launch ramp 70 at a particular angular displacement (e.g., at a particular compass direction into the wind). The propulsion mechanism 72 is constructed and arranged to impart force on the UAV 50 during launch.

During operation, if the wind direction changes, the UAV launcher 40 does not need to be manually re-maneuvered to point into the wind. Additionally, the UAV 50 does not need to be re-loaded onto a second UAV launcher 40 aimed in a different direction. Rather, a user is able to electronically rotate the turntable assembly 26 to re-direct the UAV launcher 40 to point into the wind. To this end, the user operates the drive system 66 (e.g., in the clockwise direction 74 or counterclockwise direction 76, also see FIG. 5) to electronically steer the UAV launcher 40 so that the launch ramp 70 points into the wind.

In some arrangements, the control circuitry 68 of the UAV platform 20 is equipped with a wind direction sensor that identifies the optimum azimuth setting in which to launch the UAV 50. Along these lines, the user can enter a command which directs the control circuitry 68 to automatically operate the drive system 66 to point the UAV launcher 40 into the wind as sensed by the wind direction sensor. That is, the control circuitry 68 identifies the wind direction via the sensor and then operates the turntable assembly 26 to aim the UAV launcher 40 into the wind.

In some arrangements, the control circuitry 68 is preconfigured with certain directional restrictions to prevent the UAV launcher 40 from launching the UAV 50 while the UAV launcher 40 is pointed in certain directions (e.g., towards a vessel's bridge, antenna, stack, or other superstructure extending from the ship's deck). That is, although the user may be able to rotate the UAV launcher 40 a full 360 degrees (or more), the control circuitry 68 is programmed to receive directional feedback (i.e., via position sensors that identify a current direction) and prevent the UAV launcher 40 from launching the UAV 50 when the UAV launcher 40 is aimed in particular directions or sensors indicate an obstruction.

Additionally and as best seen in FIG. 3, the UAV net apparatus 42 includes a set of poles (or supports) 80 and a mesh (or net) 82 which is held by the set of poles 80 to form a mesh plane 84 (e.g. extending along the X-Y plane in FIG. 3). Accordingly, the UAV 50 is able to fly into the mesh plane 84 in order to be captured by the net apparatus 42.

During operation, if the flight path of the UAV 50 changes so that the UAV approaches the UAV platform 20 at a different angle, the user is able to control the UAV platform 20 electronically. In particular, the user electronically controls the drive system 66 to rotate the turntable assembly 26 (i.e., about the Y-axis as seen in FIG. 3) and thus change the orientation of the net apparatus 42. Here, the net apparatus 42 does not need to be manually re-maneuvered to accommodate the change in UAV flight path. Additionally, in the context of a vessel, the vessel does not need to change direction. Rather, the user is able to electronically re-direct the net 82 to face the UAV 50. To this end, the user operates the drive system 66 (e.g., in the clockwise or counterclockwise direction) to electronically steer the UAV launcher 40 so that the net 82 faces the approaching UAV 50.

In some arrangements, the user enters a command into the control circuitry 68 of the turntable assembly 26 and the control circuitry 68 automatically identifies the direction of the approaching UAV 50. That is, the control circuitry 68 is equipped with a UAV direction sensor that is capable of locating the UAV 50 in flight. Here, the user enters a command which directs the control circuitry 68 to automatically operate the drive system 66 to face the net 82 toward the approaching UAV 50. The control circuitry 68 then faces the net apparatus 42 toward the approaching UAV 50 to optimize the capture angle of the net 82. In some arrangements, the control circuitry 68 continuously senses the UAV location and makes continuous angular adjustments in the event the UAV 50 changes its approach in a feedback manner.

Figure 6:
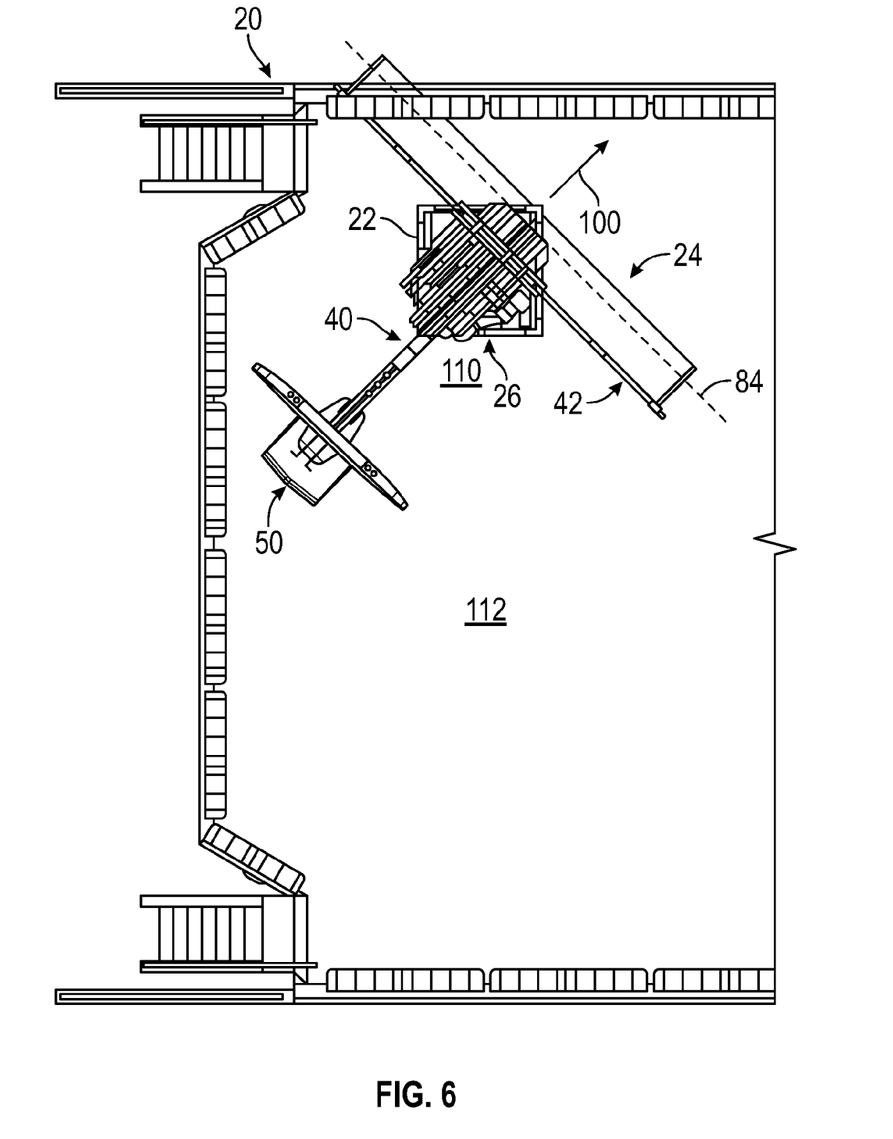
FIG. 6 is a top view of the UAV platform equipped with the net assembly at a first angle ready for UAV launch or recovery.
Figure 7:
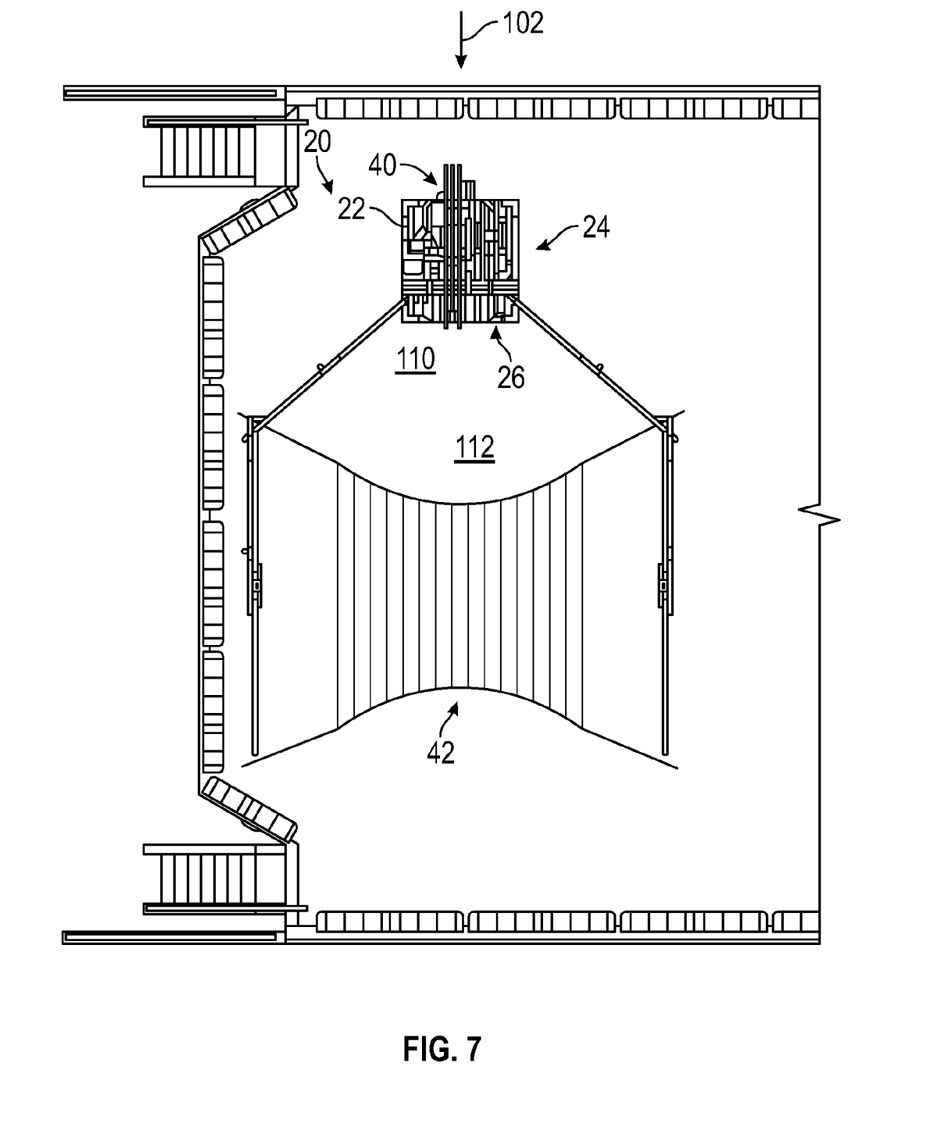
FIG. 7 is a top view of the UAV platform equipped with the net assembly at a second angle ready for UAV unloading.

FIGS. 6 and 7 illustrate the ability of the UAV platform 20 to rotate to different angles. In particular, FIG. 6 shows the UAV platform 20 aiming the UAV launcher 40 and the net apparatus 42 in a first compass direction 100. Similarly, FIG. 7 shows the UAV platform 20 aiming the launcher 40 and the net apparatus 42 in a second compass direction 102.

As shown in FIG. 6 and by way of example, the UAV platform 20 reside over a location 110 on a ship deck 112. It should be understood that the turntable assembly 26 of the UAV platform 20 enables the net apparatus 42 to rotate 360 degrees or more (also see FIG. 5). The mesh plane 84 formed by the net 82 (FIG. 3) is substantially vertical relative to the ship deck 112 and is conducive to capturing a UAV 50 flying along a trajectory (e.g., a direction collinear with that of arrow 100).

As shown in FIG. 7 and by way of example, the UAV platform 20 is rotated from the compass direction of FIG. 6 to a new compass direction 102. Additionally, the mesh plane 84 formed by the net 82 (FIG. 3) is no longer substantially vertical relative to the ship deck 102. This orientation is suitable for a variety of operations such as removal of a captured UAV 50 from the net apparatus 42, set-up or de-installation of the net apparatus 42, capture of the UAV 50 along a different flight path such as a trajectory in a direction collinear with arrow 102, and so on. Further details will now be provided with reference to FIG. 8.

Figure 8:
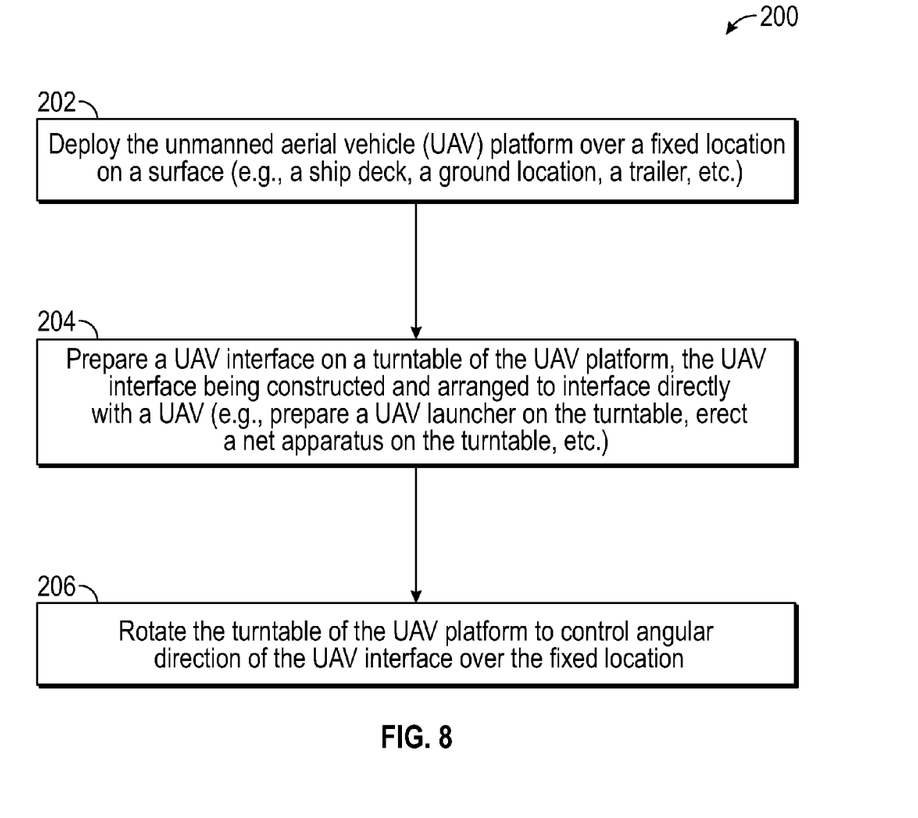
FIG. 8 is a flowchart of a procedure which is performed using the UAV platform of FIG. 1.

FIG. 8 is a flowchart of a procedure 200 which is performed by a human UAV team using the UAV platform 20 (also see FIGS. 1-4). At 202, the human UAV team deploys the UAV platform 20 over a fixed location on a surface. Due to the ability of the UAV platform 20 to rotate, the UAV platform 20 is suitable for operating in confined spaces such as on a ship deck, on a trailer, etc. with limited space.

At 204, the human UAV team prepares a UAV interface to a turntable of the UAV platform 20. Along these lines, the human UAV team may prepare a UAV launcher and/or a UAV recovery apparatus. In some arrangements, the turntable is able to support both a UAV launcher and a UAV recovery apparatus simultaneously (e.g., see FIGS. 3 and 6).

At 206, the human UAV team rotates the turntable of the UAV platform 20 to control angular direction of the UAV interface over the fixed location. As mentioned earlier, the UAV interface is constructed and arranged to interface directly with a UAV. For example, the UAV launcher is constructed and arranged to make physical contact with the UAV in order to guide and impart force on the UAV during takeoff. Additionally, the UAV recovery apparatus is constructed and arranged to ensnare the UAV while in flight (e.g., to catch and hang on to the UAV).

It should be understood that the turntable of the UAV platform 20 provides for improved launch and recovery of the UAV. In particular, the human UAV team is able to make adjustments to the UAV takeoff direction thus enabling the UAV to be pointed precisely into the wind for maximum lift even in situations where the wind direction changes dynamically, e.g., every few minutes. Furthermore, the human UAV team is able to control where a mesh plane formed by a net faces thus enabling the UAV platform 20 to accommodate a variety of UAV flight path changes during UAV capture even if the UAV platform 20 resides on a vessel which may change course over time.

It should be understood that, in some arrangements, the UAV interfaces 24 are interchangeable. For example, after the UAV team uses the UAV launcher to launch the UAV, the UAV team stows the launch ramp on the turntable and prepares a net apparatus on the turntable.

In other arrangements, the turntable supports both the UAV interfaces 24 concurrently (e.g., see FIGS. 3 and 6). Along these lines, the UAV team does not need to de-install the net apparatus when readying the UAV platform 20 for UAV launch. Similarly, the UAV team does not need to de-install the UAV launcher when readying the UAV platform 20 for UAV capture.

As described above, improved techniques are directed to utilizing a UAV platform 20 which is equipped with a turntable assembly 26. Such a platform 20 enables precise control over angular direction even if the UAV platform 20 is initially deployed at a poor angle. Accordingly, such a platform 20 alleviates the need to provide multiple UAV launchers at the same launch location. Moreover, launch and recovery elements can be integrated into the UAV platform 20 thus making the UAV platform 20 suitable for confined locations such as on a small vessel with a limited ship deck area.

At this point, one should appreciate that the UAV platform 20 offers full functionality regardless of launch-recovery conditions. In particular, the flexibility provided by the UAV platform 20 enables continuous and ongoing accommodation, i.e., access to optimal wind direction, maintenance of personnel safety, full accessibility even under site space constraints, etc.

While various embodiments of the present disclosure have been particularly shown and described, it will be understood by those skilled in the art that various changes in form and details may be made therein without departing from the spirit and scope of the present disclosure as defined by the appended claims.

For example, it should be understood that other UAV interfaces 24 and related equipment can be attached to the turntable assembly 26 of the UAV platform 20 and derive advantages from the ability of the turntable assembly 26 to rotate. Examples of such additional equipment include hardware which directs a signal toward the UAV 50 for homing, locating, tracking, communications, etc. Moreover, such equipment can be mounted and operated simultaneously while other equipment is mounted to the turntable assembly 26. Such integration alleviates the need for multiple equipment stations which would otherwise consume more space and perhaps interfere with each other.

Additionally, one should appreciate that the techniques disclosed herein are well suited for a variety of land-based and sea-based operations. Examples of such operations include military operations, surveillance operations, scouting operations, research, and so on. Such modifications and enhancements are intended to belong to various embodiments of the disclosure.

What is claimed is:

1. An unmanned aerial vehicle platform, comprising:
   a stationary base constructed and arranged to reside over a fixed location on a surface;
   a set of unmanned aerial vehicle (UAV) interfaces constructed and arranged to interface directly with a UAV; and
   a turntable assembly which couples to the stationary base, the turntable assembly being constructed and arranged to couple to each UAV interface and control angular direction of that UAV interface over the fixed location;
   wherein the turntable assembly includes:
   a lower turntable portion which connects to the stationary base,
   an upper turntable portion which connects to the set of UAV interfaces,
   a set of rollers which separates the upper turntable portion from the lower turntable portion, and
   a drive system which rotates the upper turntable portion relative to the lower turntable portion; and
   wherein the set of UAV interfaces includes:
   a net apparatus which is constructed and arranged to capture the UAV while the UAV is in flight in the angular direction for effective wind direction management.

2. An unmanned aerial vehicle platform as in claim 1 wherein the stationary base includes:
   a logistic handling system flat rack pallet coupled to the lower turntable portion, the flat rack pallet enabling the unmanned aerial vehicle platform to be deployed from a carrier to the fixed location on the surface via a pallet handling device.

3. An unmanned aerial vehicle platform, comprising:
   a stationary base constructed and arranged to reside over a fixed location on a surface;

a set of unmanned aerial vehicle (UAV) interfaces constructed and arranged to interface directly with a UAV; and a turntable assembly which couples to the stationary base, the turntable assembly being constructed and arranged to couple to each UAV interface and control angular direction of that UAV interface over the fixed location;

wherein the turntable assembly includes:
a lower turntable portion which connects to the stationary base,
an upper turntable portion which connects to the set of UAV interfaces,
a set of rollers which separates the upper turntable portion from the lower turntable portion, and
a drive system which rotates the upper turntable portion relative to the lower turntable portion;
wherein the unmanned aerial vehicle platform operates as an integrated UAV launch and recovery system;
wherein the set of UAV interfaces includes (i) a UAV launcher and (ii) a net apparatus; and
wherein the upper turntable portion of the turntable assembly is constructed and arranged to selectively connect to (i) the UAV launcher to launch the UAV from the fixed location and (ii) the net apparatus to capture the UAV while the UAV is in flight.

4. An unmanned aerial vehicle platform as in claim 3 wherein the UAV launcher includes:
a launch ramp constructed and arranged to guide the UAV during launch, the turntable assembly controlling direction of the launch ramp to provide azimuth control during launch, and
a propulsion mechanism to impart force on the UAV during launch, and
wherein the turntable assembly is constructed and arrange to rotate the launch ramp to (i) a first angular displacement to install the UAV on the launch ramp prior to launch and (ii) a second angular displacement to launch the UAV into the wind following installation.

5. An unmanned aerial vehicle platform as in claim 3 wherein the net apparatus includes:
a mesh constructed and arranged to ensnare the UAV during flight, and
a set of side poles constructed and arranged to support the mesh when the mesh ensnares the UAV; and
wherein the turntable assembly is constructed and arrange to rotate the mesh to (i) a first angular displacement to catch the UAV on a mesh plane formed by the mesh during flight and (ii) a second angular displacement to maneuver the mesh plane formed by the mesh to unload the UAV from the mesh following UAV capture.

6. An unmanned aerial vehicle platform as in claim 1 wherein the set of UAV interfaces further includes:
a UAV launcher which is constructed and arranged to launch the UAV from the fixed location and in the angular direction into the wind for effective wind direction management.

7. An unmanned aerial vehicle platform as in claim 6 wherein the UAV launcher includes:
a launch ramp constructed and arranged to guide the UAV during launch, and
a propulsion mechanism to impart force on the UAV during launch, wherein the turntable assembly controls direction of the launch ramp to provide azimuth control during launch.

8. An unmanned aerial vehicle platform as in claim 7 wherein the turntable assembly is constructed and arrange to rotate the launch ramp to (i) a first angular displacement to enable installation of the UAV on the launch ramp of the UAV launcher prior to launch and (ii) a second angular displacement to launch into the wind following installation.

9. An unmanned aerial vehicle platform as in claim 1 wherein the net apparatus includes:
a mesh constructed and arranged to ensnare the UAV during flight, and
a set of side poles constructed and arranged to support the mesh when the mesh ensnares the UAV.

10. An unmanned aerial vehicle platform as in claim 9 wherein the turntable assembly is constructed and arrange to rotate the mesh to (i) a first angular displacement to provide a mesh plane for the UAV to hit during flight and (ii) a second angular displacement to enable unloading of the UAV from the mesh following UAV capture.

11. A method of operating an unmanned aerial vehicle platform, the method comprising:
deploying an unmanned aerial vehicle (UAV) platform over a fixed location on a surface, the unmanned aerial vehicle platform including:
(i) a stationary base constructed and arranged to reside over the fixed location on the surface,
(ii) a set of UAV interfaces constructed and arranged to interface directly with a UAV, and
(iii) a turntable assembly which couples to the stationary base, the turntable assembly being constructed and arranged to couple to each UAV interface and control angular direction of that UAV interface over the fixed location,
wherein the turntable assembly includes:
a lower turntable portion which connects to the stationary base,
an upper turntable portion which connects to the set of UAV interfaces,
a set of rollers which separates the upper turntable portion from the lower turntable portion, and
a drive system which rotates the upper turntable portion relative to the lower turntable portion, and
wherein the set of UAV interfaces includes:
a net apparatus which is constructed and arranged to capture the UAV while the UAV is in flight in the angular direction for effective wind direction management;
preparing a UAV interface of the set of UAV interfaces on the turntable assembly of the UAV platform; and
rotating the turntable to control angular direction of the UAV interface over the fixed location, the UAV interface being constructed and arranged to interface directly with a UAV.

12. A method as in claim 11 wherein the set of UAV interfaces further includes a launch ramp; and wherein the method further comprises:
preparing the launch ramp on the turntable assembly, the launch ramp being constructed and arranged to guide the UAV during launch.

13. A method as in claim 12 wherein rotating the turntable to control angular direction of the UAV interface over the fixed location includes:
aiming the launch ramp in a first direction into the wind for effective wind direction management.

14. A method as in claim 13, further comprising:
loading the UAV on to the launch ramp, and
launching the UAV from the launch ramp in the first direction into the wind.

15. A method as in claim 14, further comprising:
stowing the launch ramp from the turntable, and preparing the net apparatus on the turntable, the net apparatus forming a mesh plane to capture the UAV while the UAV is in flight.

16. A method as in claim 15, further comprising:
rotating the net apparatus on the turntable in a second direction to orient the mesh plane to provide a maximum capture area.

17. A method as in claim 16, further comprising:
capturing the UAV using the net apparatus while the UAV while the UAV is in flight.

18. A method as in claim 15 wherein stowing the launch ramp and preparing the net apparatus occur while the UAV is in flight.

19. An unmanned aerial vehicle platform as in claim 1 wherein the unmanned aerial vehicle platform operates as an integrated UAV launch and recovery system;
wherein the set of UAV interfaces further includes a UAV launcher; and wherein the upper turntable portion of the turntable assembly is operative to connect with (i) the UAV launcher to launch the UAV from the fixed location and (ii) the net apparatus to capture the UAV while the UAV is in flight.

20. An unmanned aerial vehicle platform as in claim 19 wherein the wherein the upper turntable portion of the turntable assembly is operative to simultaneously connect with the UAV launcher and the net apparatus.

21. An unmanned aerial vehicle platform as in claim 3 wherein the stationary base includes:
a logistic handling system flat rack pallet coupled to the lower turntable portion, the flat rack pallet enabling the unmanned aerial vehicle platform to be deployed from a carrier to the fixed location on the surface via a pallet handling device.

* * * * *